US007129891B2

(12) United States Patent
Meunier (10) Patent No.: US 7,129,891 B2
(45) Date of Patent: Oct. 31, 2006

(54) METHOD FOR DETERMINING PROXIMITY OF DEVICES IN A WIRELESS NETWORK

(75) Inventor: Jean-Luc Meunier, Saint Nazaire les Eymes (FR)

(73) Assignee: Xerox Corporation, Stamford, CT (US)

(*) Notice: Subject to any disclaimer, the term of this patent is extended or adjusted under 35 U.S.C. 154(b) by 413 days.

(21) Appl. No.: 10/719,420

(22) Filed: Nov. 21, 2003

(65) Prior Publication Data

US 2005/0113107 A1 May 26, 2005

(51) Int. Cl.
*H04Q 7/32* (2006.01)
*H04Q 7/34* (2006.01)
*H04Q 7/38* (2006.01)

(52) U.S. Cl. .................... 342/463; 340/539.23
(58) Field of Classification Search ............ 342/463, 342/357.08; 340/539.23, 825.49, FOR. 104
See application file for complete search history.

(56) References Cited

U.S. PATENT DOCUMENTS

| | | | |
|---|---|---|---|
| 5,926,765 | A | 7/1999 | Sasaki |
| 6,393,294 | B1 | 5/2002 | Perez-Breva et al. |
| 6,504,503 | B1* | 1/2003 | Saint-Hilaire et al. . 342/357.08 |
| 6,564,055 | B1 | 5/2003 | Hronek .................. 455/433 |
| 6,597,916 | B1 | 7/2003 | Edge ..................... 455/456 |
| 6,603,977 | B1 | 8/2003 | Walsh et al. ............ 455/456 |
| 6,618,005 | B1 | 9/2003 | Hannah et al. ......... 342/357.1 |
| 2002/0095486 | A1 | 7/2002 | Bahl ..................... 709/223 |
| 2003/0016159 | A1* | 1/2003 | Stayton et al. ............ 342/30 |
| 2004/0212533 | A1* | 10/2004 | Whitehead et al. .... 342/357.08 |
| 2005/0130634 | A1* | 6/2005 | Godfrey ............... 455/456.3 |
| 2005/0157689 | A1* | 7/2005 | Schnurr ................ 370/338 |

FOREIGN PATENT DOCUMENTS

| | | |
|---|---|---|
| EP | 0 690 644 A2 | 1/1996 |
| WO | WO 00/50918 | 8/2000 |
| WO | WO 00/50919 | 8/2000 |

OTHER PUBLICATIONS

J.-L. Meunier, Peer-to-peer determination of proximity using wireless network data, Proceedings of the Second IEEE Annual Conference on Pervasive Computing and Communications Workshops, p. 70-74, Mar. 2004.*

(Continued)

*Primary Examiner*—Thomas H. Tarcza
*Assistant Examiner*—Fred H. Mull
(74) *Attorney, Agent, or Firm*—Jeannette Walder (57) ABSTRACT

In a wireless network, two or more devices can determine how close they are from one another in a peer-to-peer way, by exchanging the network characteristics they observe in real time. A method for determining device proximity in a wireless network, includes characterizing at a first device any detected wireless network radio signals; receiving any broadcast network characteristics from at least one other device on the network; comparing the first device network characteristics with the received network characteristics from the at least one other device on the network; if the network characteristics are within a predetermined relationship, the first device and the at least one other device are in proximity with one another. Network characteristics may include signal strength, noise level and MAC address of the transmitting device. The method eliminates the need to calibrate WiFi signal strength as a function of location in a particular area.

14 Claims, 3 Drawing Sheets

OTHER PUBLICATIONS

J. Krumm et al., The NearMe wireless proximity server, Proceedings of The Sixth International Conference on Ubiquitous Computing (UbiComp 2004), p. 283-300, Sep. 2004.*

Paramvir Bahl, Venkata N. Padmanabhan, "Radar: An In-Building RF-based User Location and Tracking System", Proc. IEEE Infocom 2000.

Paul Castro, Patrick Chiu, Ted Kremenek, Richard Muntz, "A Probabilistic Room Location Service for Wireless Networked Environments", UbiComp 2001, pp. 18-34.

Lars Erik Holmquist, Friedemann Mattern, Bernt Schiele, Petteri Alahuhta, Michael Beigl, Hans-W. Gellersen, "Smart-Its Friends: A Technique for Users to Easily Establish Connections between Smart Artefacts", UbiComp 2001.

* cited by examiner

METHOD FOR DETERMINING PROXIMITY OF DEVICES IN A WIRELESS NETWORK

FIELD OF THE INVENTION

This invention relates generally to a method for determining the proximity of mobile devices in a wireless network.

BACKGROUND OF THE INVENTION

Software systems are foreseen to become more sensitive and reactive to their users' current situation and activities. Software systems running on mobile devices will need to sense their physical and digital environment, for instance noise level, location, movement, keyboard activity, software application in use, etc. Location-dependent applications are flourishing in research communities and emerging in the marketplace. Indeed, the location of a device or of a user is an important aspect to consider because of the implication it has regarding potential people activities and surrounding resources. Location is of particular interest in many applications. Location is currently either thought as a logical location (for instance "room 102") or as an area defined in a coordinate system or as a functional location (for instance "office of John Smith").

With the widespread availability of GPS and inexpensive GPS receivers, determination of location using GPS is a good solution for outdoor situations. GPS is a line of sight application which does not operate very well within buildings, unless pseudosatellites, or pseudolites, which are ground-based GPS transmitters, are available. Alternate methods of determining location of mobile devises indoors have emerged. Some methods involve a specific infrastructure, such as infrared beacons or ultrasound emitters while others rely on "triangulation" of the signal of a wireless network. The latter is advantageous since it relies on a now widespread infrastructure, a wireless network, and since it provides the location mostly as a by-product of the networking service.

The wireless or WiFi triangulation method (the method does not actually rely on triangulation of measured signals, since wireless signals are not directional. The WiFi triangulation method relies on characterizing each place by the signal strength of the wireless access points that cover it. A calibration phase is first used to map the values of the signal strength throughout the area in which devices are intended to be tracked. After the calibration phase the values of the access point signal strengths are used to find the most probable device location. In one implementation, the wireless triangulation location method compares measured wireless signal strength to a table of wireless signal strengths and known locations, finds the table entry with the closest signal strength to the measured signal strength and determines its location by reference to the found table entry.

The wireless triangulation method relies on supervised machine learning techniques, which involve the collection of labeled network samples. The calibration phase consists of physically visiting each location in order to record a series of network samples for training the system. There are three main issues with WiFi triangulation. First, the required calibration phase is time consuming. Secondly, the collected data can be partially invalidated because of environmental changes (often as simple as the difference between a room full of people and an empty room), which silently modify the radio wave propagations and reflections within the area, and therefore require a new calibration. Thirdly, finding the most probable location requires a significant amount of memory and processing capability. Indeed the larger the calibration data is, the more accurate will be the method, and the more memory and CPU it will require. Some systems solve the memory and CPU issue, by letting the mobile device report the radio condition it experiences to a central machine that determines the device location, or in other words, tracks the device location. Also, depending of the settings, the user may reject or object to this approach, for privacy reasons.

SUMMARY OF THE INVENTION

For applications where location sensing is not an intrinsic need but for which proximity sensing can suffice, two or more devices can determine how close they are from one another in a peer-to-peer way, by exchanging the network characteristics they observe in real time. Compared with the prior art approaches, the method of the invention is lightweight, general and does not suffer from the drawbacks listed above. A method for determining device proximity in a wireless network provides useful information in view of building software systems that are more sensitive to the user situation and activity. Additionally, the method can indirectly give the geographical location in certain cases, for example, if the device is in close to another device that is not mobile or that knows its location via another mechanism.

A method for determining device proximity in a wireless network, according to the invention, includes characterizing at a first device any detected wireless network radio signals; receiving any broadcast network characteristics from at least one other device on the network; comparing the first device network characteristics with the received network characteristics from the at least one other device on the network; and if the network characteristics are within a predetermined relationship, the first device and the at least one other device are in proximity with one another. Characterizing may include, for each wireless access point emitting a detectable wireless network radio signal, measuring signal strength and noise level; and detecting the wireless access point's MAC address, if any. MAC or Media Access Control address is a hardware address that uniquely identifies each node of a network. In IEEE 802 networks, the Data Link Control (DLC) layer of the OSI Reference Model is divided into two sublayers: the Logical Link Control (LLC) layer and the Media Access Control (MAC) layer. The MAC layer interfaces directly with the network media. Consequently, each different type of network media requires a different MAC layer.

Network characteristics may be determined by measuring the distance in radio space of the respective network characteristics. Distance in radio space may be determined by measuring the sum of the gap in signal strength and noise level for each channel. A detailed algorithm for measuring distance in radio space as well as for determining precision and recall is described below. If the location of the at least one other device is known, the first device's relative position (e.g., location) from the at least one other device may be determined.

There are classes of applications that do not intrinsically require location sensing. Taking the classic example of the discovery of services surrounding a mobile user, such as a cab service or pharmacy, one approach consists of determining the user's location in order to perform a service lookup in some database. Intrinsically, it is the determination of proximity, rather than exact location, that is required. In this example, the user's handheld could discover the surrounding services in a peer-to-peer mode, without the need for a database lookup. The method for determining device proximity eliminates the need for a calibration phase. It is therefore more general and lightweight, since the method may work on any wireless network (known or unknown ones like hotspot) and since there is no need for complex computation of the current location.

In the method of determining device proximity in a wireless network, a device indexes the situations it encounters by the observed characteristics of the wireless network radio signal. Two devices can discover that they are close to each other, by exchanging the radio characteristics they observe. Each device monitors, for example, the wireless network signal strength, noise level and the MAC address of emitting base stations in the area around the device. By characterizing a place, rather than identifying it, calibration data is not required. The method enables devices to characterize the wireless network on a real-time basis. Thus, if the environment of a location changes (due to furniture being moved or the number of persons in the area), each device is able to determine proximity by comparing current network characterizations with the current network characterizations measured by other devices. Indexing the encountered situations consists in labelling the situation with these radio characteristics.

A group of devices can determine if they are in the same vicinity, i.e., if they are in proximity to one another, by exchanging the radio characteristics they observe. This implies that the devices are in contact with one another, but since the method uses wireless network technology we can assume that the devices have the ability to be in contact with one another.

In accordance with another aspect of the invention, a method for indexing situations and actions associated with a device in a wireless network, may include characterizing at a first location any detected wireless network radio signals; associating an action or situation of the device with the network characteristics at the first location; storing the network characteristics in an index of network characteristics; comparing the network characteristics at the first location with any network characteristics stored in the index; if the network characteristics at the first location are within a predetermined relationship to any network characteristics in the index, identifying any actions or situations associated with the network characteristics in the index. The method can be used to index situations or actions with the network characteristics. These features may be used, for example, for maintaining a memory of a configuration. For example, if a user used software on his iPaq to control a VCR in a given location on one day, then the network characteristics associated with the iPaq at that day would be stored in an index and associated with the room and activity. The next time the user came to that location and characterized the network, he would compare the values to those stored in the index and come up with the association of controlling the VCR.

DETAILED DESCRIPTION

In accordance with a method for determining device proximity in a wireless network, each device monitors the wireless network signal strength, noise level and the MAC address of the emitting base stations (and any other transmitting devices). Each device also acts as a peer in a network of peers exchanging the radio characteristics they observe. In this way, they can discover if they are in proximity of each other. The device may characterize the network by computing the average signal strength (SS) and noise level (NL) for each channel over a running window of time. Radio characteristics may be stored as a set of records, one per channel, each record indicating the channel MAC address and the observed SS and NL. The radio characteristics may be stored in a time-stamped journal, located in the device's memory. The device may collaborate with other devices on the local area network by exchanging with them the radio characteristics they respectively observe, in order to determine if they are in proximity of each other. The device may determine which of the other devices are close, by measuring the distance in the radio space of the respective characteristics, and comparing with one (or several) threshold(s) to determine the (degree of) proximity.

The fact of being on the same local area network indicates some level of proximity and is a first filter. A second level filter consists in comparing the set of wireless access points the devices see (e.g., by MAC address). The next level of precision is obtained by measuring the distance in the radio space of the respective characteristics, which can be considered as a vector of scalars that represent the signal strength and noise level for each visible access point. A distance in this space can then be devised. One exemplary distance, called the Manhattan distance, i.e., the sum of the gap in terms of signal strength and noise level (both measured in dB) for each channel may be determined. According to our experience, this distance is as good as many others and has the merit of simplicity.

$$D_{Manhattan} = \sum_{ch} |SS_{ch} - SS_{ch}| + \sum_{ch} |NL_{ch} - NL_{ch}|$$

However other distances can be devised, for instance to take into account that the signal decreases with the squared power of the distance to its source (power is proportional to $1/d^2$) and therefore an important signal strength gap on a powerful signal is less significant in terms of physical distance than on a less powerful signal. The distance may also be normalized on the number of channels (by dividing it by this number), in order to get an average value per channel and become independent on the number of channels.

It may be desirable to limit the number of records. Taking into account the fact that a device is motionless most of the time, a simple improvement may include episoding from the collected data, that is, storing only after a significant change of value and/or only when some stability of the value is reached. The former to avoid making a new record for a change that is not significant in term of distance, the latter to avoid recording transitory states. In some cases transitory states maybe of interest, for example if two people walk together. Additionally, simple compression methods may be applied to the recorded data since they will exhibit some regularities due their owner's habits.

As the received signal strength can vary according to the orientation of the device, two devices might be physically close but may receive different signal strengths from one or more base stations if they are oriented in different directions. Therefore, we cannot expect a zero-error method and we have estimated it in term of precision and recall as explained below.

Figure 1:
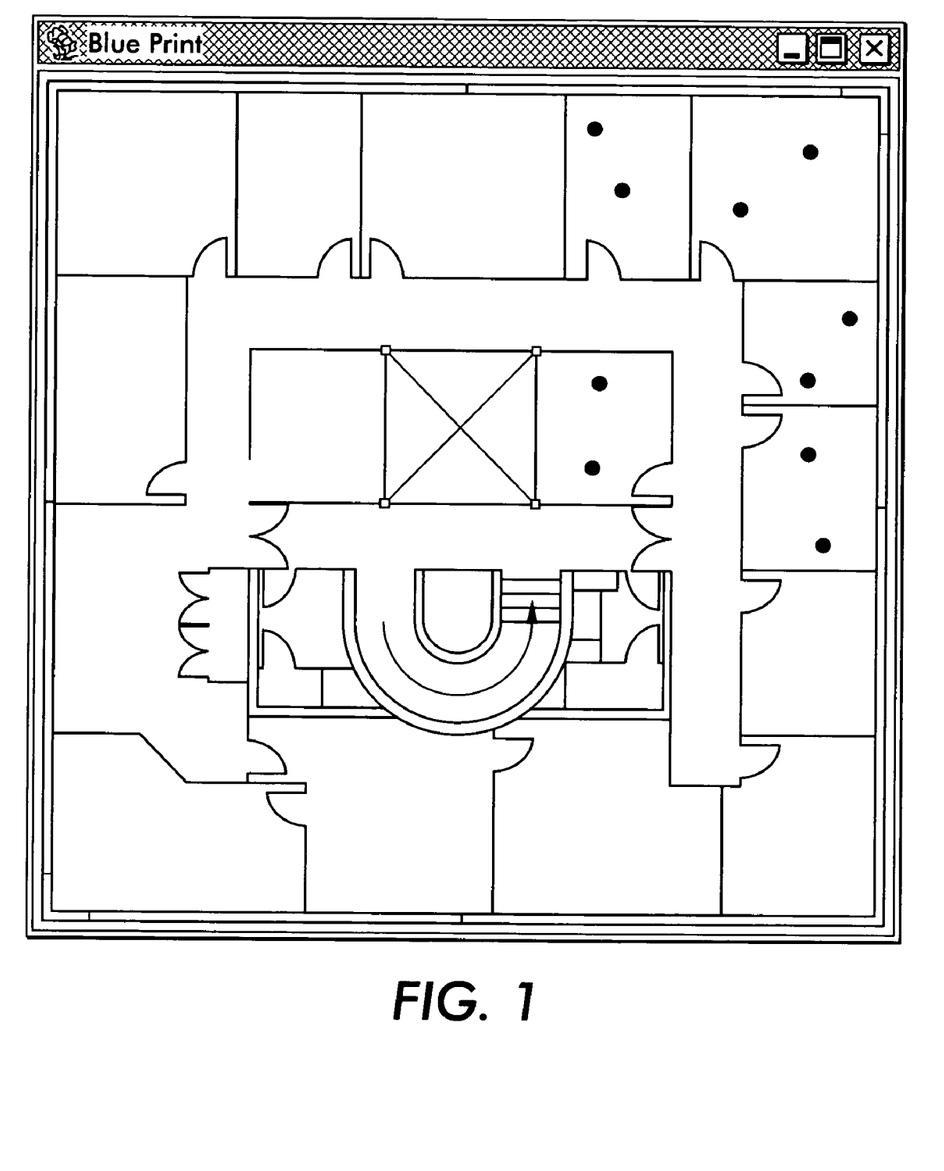
FIG. 1 is a plan view of an office in which various signal strength and noise level measurements were taken.

For doing so, we have taken 64 samples in the four directions in two different points of five offices on the 1st floor of a building. We chose these offices because they are have a good coverage by the access points. This makes 640 samples forming five groups of 120 close samples covering the five offices. This is shown in FIG. 1, where the dots indicate where the samples were taken from.

Figure 2:
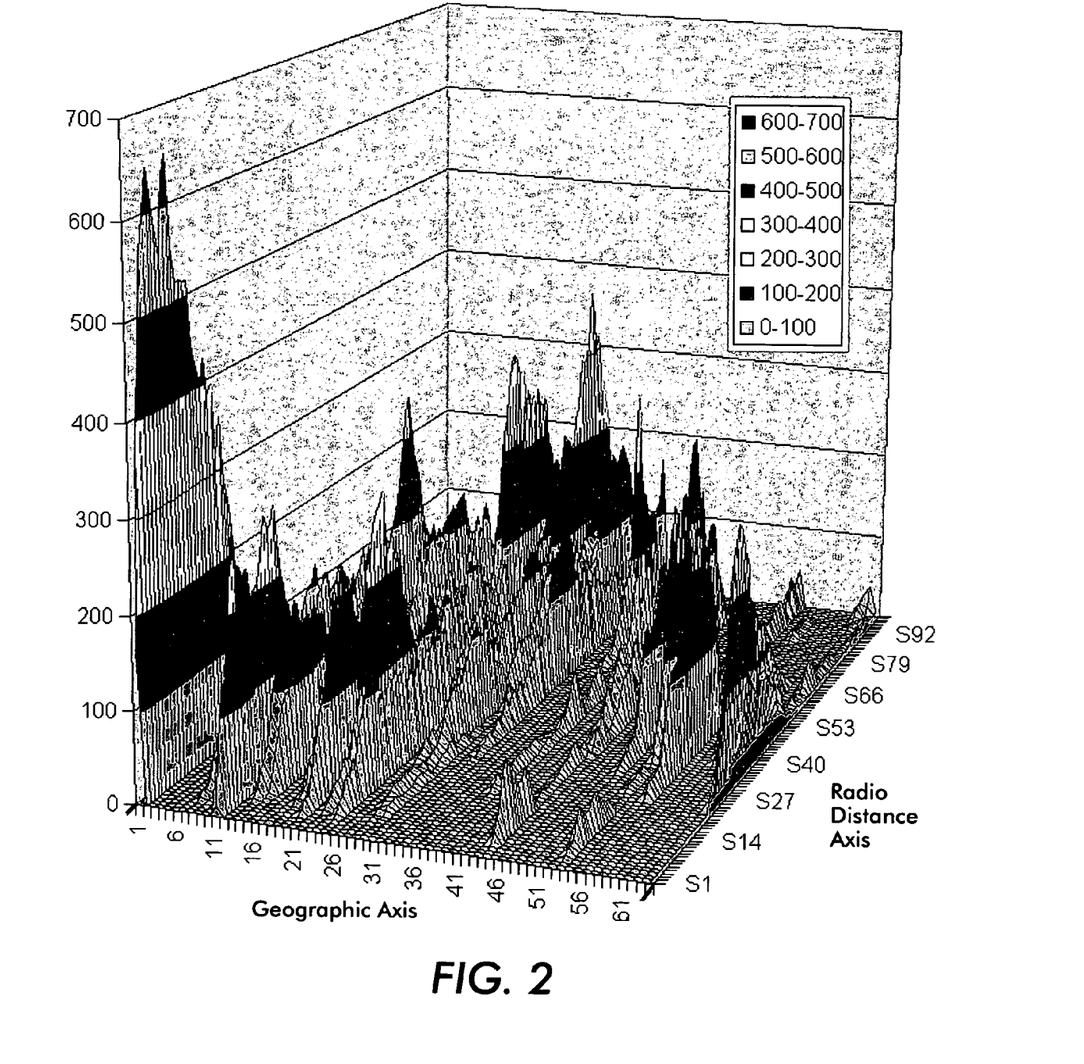
FIG. 2 is a graph of measured radio distance for the measurements taken in FIG. 1.

To test if proximity can be determined using the Manhattan distance, we took all possible pairs of samples. We then computed the distance in the geographic space and in the radio space for each. In order to visualize the frequency of each situation (how many pairs with geographic distance d and radio distance d') we draw a surface where the Z axis shows the number of occurrences, as shown in FIG. 2 (where number of pairs given their geographical distance and radio distance). Note that not all pairs are shown in FIG. 2, but rather only those closer than 100 in the radio space for clarity purpose.

The data can be analyzed in terms of precision and recall. Precision indicates how often two devices are geographically close when they are "radiocally" close (where the term radiocally close is used to denote the notion of being close in the radio space). Recall indicates how often two devices are "radiocally" close when they are geographically close.

Given an accuracy of A meters, the Euclidian geographic distance Dgeo and a threshold T for the radio distance Dradio (Dradio is the normalized DManhattan here), we compute the precision and recall as the ratios of the cardinal of pair sets:

Precision $(A,T)$=Card$\{D_{geo}<A$ and $D_{radio}<T\}$/ card$\{D_{radio}<T\}$ and Recall $(A,T)$=Card$\{D_{geo}<A$ and $D_{radio}<T\}$/ card$\{D_{geo}<A\}$.

Table 1 below indicates for each case the precision and recall.

| | Precision/Recall in % for pairs radiocally closer than/geographically closer than . . . | | | | |
|---|---|---|---|---|---|
| | 2 meters | 3 meters | 4 meters | 6 meters | ∞ |
| 6 | 96/10 | 100/8 | 100/6 | 100/4 | 100/3 |
| 12 | 73/27 | 90/26 | 94/21 | 97/15 | 100/10 |
| 25 | 61/53 | 77/53 | 86/45 | 93/33 | 100/24 |
| 50 | 49/74 | 63/74 | 77/69 | 87/52 | 100/41 |
| ∞ | 27/100 | 35/100 | 46/100 | 68/100 | 100/100 |

Table 2 below indicates the observed precision and recall, where F1 is the value for each (precision, recall) couple and F1 is defined as 2PR/(P+R) where P and R respectively are the precision and recall.

| | F1 For pairs radiocally closer than/geographically closer than . . . | | | | |
|---|---|---|---|---|---|
| | 2 meters | 3 meters | 4 meters | 6 meters | ∞ |
| 6 | 18 | 15 | 11 | 8 | 5 |
| 12 | 39 | 41 | 35 | 25 | 19 |
| 25 | 57 | 63 | 59 | 48 | 39 |
| 50 | 59 | 68 | 73 | 65 | 58 |
| ∞ | 43 | 52 | 63 | 81 | 100 |

The orientation problem (the device orientation is not known to the system despite its playing a role in the observed radio characteristics) negatively impacts the recall, because even those samples taken very close to each other can have a significantly different radio signal. On the other hand, it is possible to trade precision for a better recall, and it is for instance possible to get a 63% of precision with 3 meters accuracy and a recall of 74%.

Several protocols can be envisaged to let the devices exchange both the network characteristics and their identity while satisfying the requirements below:

1. Ability to operate in a dynamic environment, where devices can join and leave the network at any time;
2. Efficiency, this protocol must be executable as a non-disruptive background task on the device, typically a handheld device;
3. Privacy, to avoid free lurkers from quietly listening and violating privacy of people. This applies both to the radio values and the device identity, but with possibly different importance;
4. Reliability, external attacks should not disrupt the proximity determination.

Two other factors play an important role in designing this software system. First, the network card used on most devices in a wireless network forces a low network-monitoring frequency, 4 Hz being a maximum in our experience. Second, whenever the network card is moving, the network card returns values with a high variance, so there are periods of time where a device may not get an accurate read of the network characteristics.

For exemplary purposes, a simple protocol that accounts for the two first requirements was chosen. The basic behavior of a peer is to periodically broadcast a UDP packet announcing its identity and containing the network characteristics it perceives. Current period is of 10 seconds, but other periods may be used. In order to increase the relevance of the proximity determination, it is desirable to synchronize this sharing of information, so when a peer receives a packet from another peer, it changes its own broadcast phase to synchronize with that peer, unless it broadcasted a packet less than half a period ago, in which case it remains silent. A peer can determine its proximity to another peer every time it receives a packet from it. When a new peer connects onto a network, it waits for packets for one period. In the absence of a packet reception during this time, it then starts periodically broadcasting a UDP packet. A global property may be that all peers get in sync with the peer having the fastest clock, this synchronization possibly taking several cycles because of packet loss.

Since the samples of network signal strength must be compared with those from other devices it is important that the samples are aligned in time otherwise it will be impossible to correlate the samples of observed signal strength.

However, two factors reduce the importance of this issue. First the monitoring of the network cannot be done at really high frequencies, 4 Hz being a maximum in our experience, primarily because of the capability of the network card. So the delay induced by the exchange of data can be small enough to be neglected. Second, it is desirable that devices exchange data only when the situation is stable, so within two time windows of stability a slight de-synchronization is negligible. In addition, it is still possible to exploit the fact that all devices are connected to a wireless network and use this to synchronise the clocks—for example, have a system on the network intermittently send synchronization messages or use some more sophisticated scheme such as NTP or that used by the DCE middleware.

This protocol was implemented on iPaq with the PocketPC operating system. We have mapped the radio distance to three levels of proximity: close, nearby, far. Subjectively, the software smoothly runs in background and provides reasonable results.

However, this protocol may not be satisfactory in terms of reliability and privacy. Reliability can be improved to prevent impostors by including an authentication mechanism to ensure the identity of the packet sender. Another form of attack is packet flooding, but such an attack may at maximum only double the broadcast frequency. The privacy requirements may be more difficult to achieve. One way to achieve some privacy is to let a device maintain a buddies list to restrict the devices with which information is exchanged.

Figure 3:
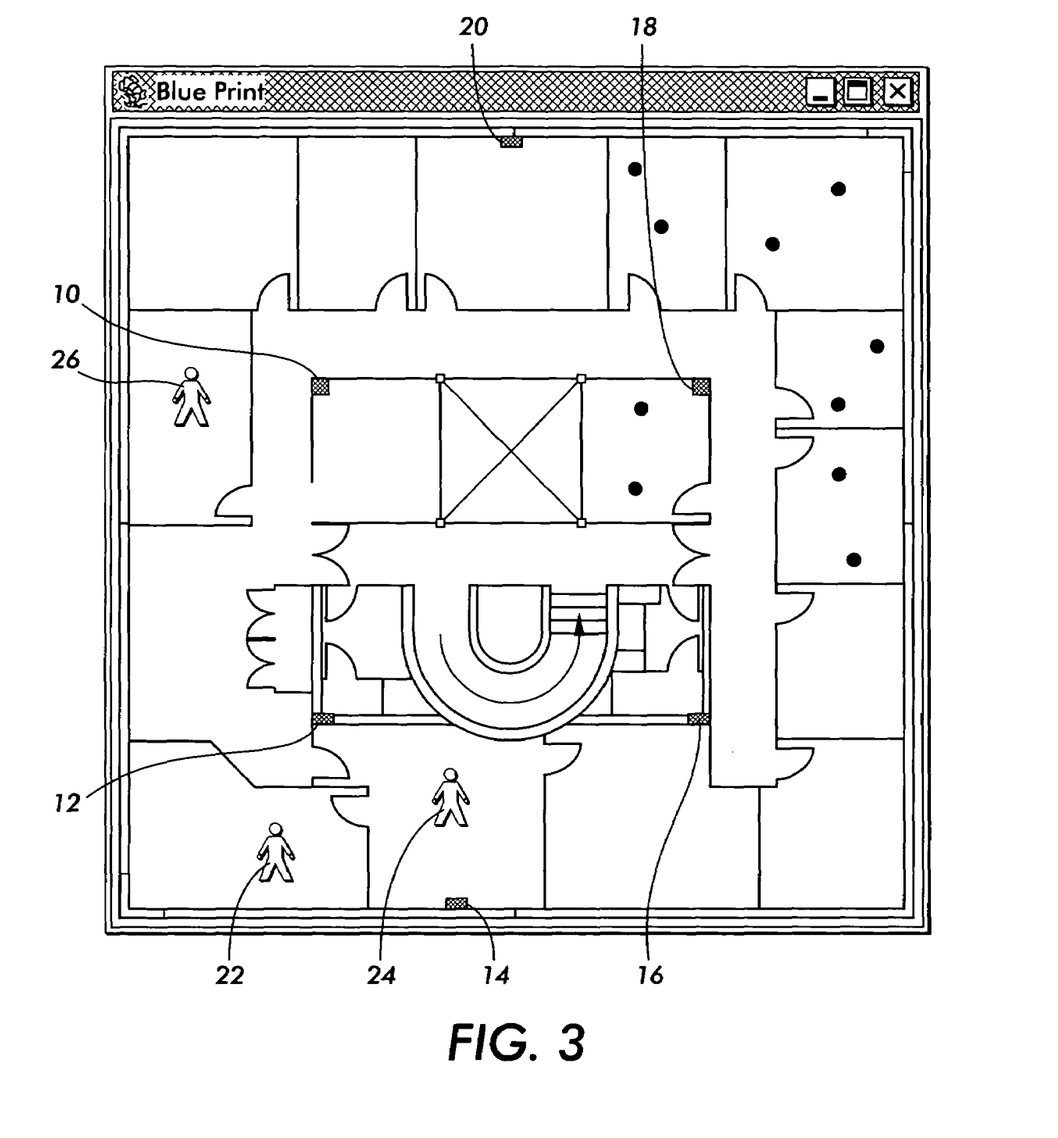
FIG. 3 is a plan view of an area where users employ the method for determining device proximity

Referring to FIG. 3, the floor of the building shown in FIG. 1 has been installed with wireless access points 10, 12, 14, 16, 18 and 20. Users 22, 24 and 26 have wireless devices which are capable of characterizing the network wireless radio signals being transmitted by the wireless access points 10–20. For example, user 22 would generate a set of network characteristics for each wireless access point that it receives a wireless radio signal. In most cases, user 22, by virtue of its location, would receive stronger signals from access points 12 and 14 than from access points 10 and 16. The other users 24 and 26 would generate network characteristics based on their locations. Each user 22, 24, 26 would then transmit its network characteristics and receive the transmitted characteristics from the other transmitting users on the network. In this case users 22 and 24 might deduce that, based on the relative strengths of their network characteristics (it is likely that each would have similar network characteristics from stations 12 and 14), they are in proximity to one another. This determination is confounded by the fact that a wall separates them, but a door in the wall is open.

Determining proximity also permits, in some situations, determining the co-location of two or more devices, where co-location is the notion of sharing the same location according to some location model. For instance, one may be interested in defining rooms and determining whether two devices are in the same room using the proximity method. Of course, two devices may be geographically close to each other but separated by a wall, although in this case it is likely that the two devices might experiment with a significantly different radio signal. The notion of co-location depends on the location model and the kind of environment (open spaces, large versus small rooms, etc.) to determine how well proximity determines co-location.

Although the method only identifies close devices and not the actual location of a device, there are cases in which it may be possible to use an extension of this approach to identify the actual physical location. This occurs when one (or more) of the devices located near each other is aware of its physical location. Since it is close to the other devices, they must also be at the same location and therefore can indirectly discover their real location. A mobile device that is present in its cradle or docking station knows that it is (likely) in its user's office or some well-known fixed location. Infrared beacons could identify rooms to a device that has an infrared sensor. RFID tags could be used to discover the location. Either the device is tagged and is informed of its location when its tag is read by a server or the location is tagged and the device reads the tag to discover its location. Independently of the technique used by a device to discover its location, the process rests the same: the devices collaborate to determine proximity as previously described; one or more devices use one of a variety of techniques to discover their physical location; and devices that know their physical location may multicast this information to their proximity set.

The method can be implemented through an interface like the one below.

METHOD: <listof<date, duration>> GetLastTimesHere( )
    This method returns the list of date when the current radio characteristics were observed, together with the duration of the observation (or say, episode). Alternatively, each item of the list can be associated with a weight indicating how close the radio characteristics were.

EVENT: StartOfProximity (MAC#, probadistrib)
    This event is raised when a close position with another device is detected. Its MAC address can for instance be provided. A probability distribution of the distance separating the two devices can also be provided.

EVENT EndOfProximity (MAC#)
    This event is raised when a previously detected proximity has ended.

The determination of proximity can satisfy a wide range of context-aware applications, which currently rely on the determination of an absolute location. One example is the idea of letting the user control nearby devices, e.g., projectors, heaters, etc., with her/his handheld or laptop. In this case the determination of absolute location combined with a database of devices location is satisfactory. Under the assumption that at least one of the devices is WiFi-enabled, proximity determination is sufficient. Actually, if all devices are WiFi-enabled then the database is no longer needed. Another range of applications aims at facilitating face-to-face interactions or raising awareness of colleagues' presence in the office environment. Again, either location or proximity determination may satisfy the application needs, the latter being less precise and potentially less useful for actually facilitating a meeting, but more acceptable from a privacy perspective.

The method can be used to index situations or actions with the network characteristics and to detect close devices. These features may be used, for example, for maintaining a memory of a configuration. A device associates with the current radio characteristic the fact that the user connected to the network using the configuration Z. This Z configuration is therefore proposed to the user the next time at the same place. This feature works even if the device has no network access (for instance because of the network security mechanism.). It is always possible to sense the radio characteristics even without access to a wireless network. Of course, if the orientation or exact location changes from one time to the other, the device may not recognize the radio scene, but this may also fit the user's expectation and this problem is may not be that frequent because users tend to have habits and to follow them. Referring to FIG. 3, user 26 might store the network characteristics it generates while in his current location in an index on his mobile device. User 26 might associate the fact of the location (e.g., which room he was in at the time) as well as any other activities that he may have been engaged in (e.g., accessing the internet through a land line).

The method can be used for maintaining a memory of an action. A device can similarly remember that at the current place, the user switched off the alarm sound or opened his agenda and notebook, or consulted some web page (bookshelf index, . . . ). These actions could be done proactively or at least made easily accessible on the device GUI. The method can be used for maintaining a memory of a document. A device may remember which documents were accessed at a given place, like a DocuShare collection when in Mont-Blanc, or the email tool. The method can be used for maintaining detection of and memory of devices in proximity to it. The set of close devices becomes an important cue for determining context: how many people, who are they, etc. Again, this may help a lot when trying to distinguish between the kind of meeting going on and therefore deducing the kind of service or documents the user will need.

A method for determining device-to-device proximity in a peer-to-peer way by compares the radio characteristics of a WiFi network, as perceived by each device. This method can be exploited for building context-aware software services. In some cases, proximity determination is sufficient for the targeted application and it can replace the more resource intensive WiFi triangulation location methods. The method may be easily implemented on small devices, which can form a network of peers to elegantly determine proximity among one another. Various protocols can be used to establish communication between devices.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for determining device proximity in a wireless network, comprising:
    characterizing at a first device any detected wireless network radio signals, wherein characterizing comprises for each wireless access point emitting a detectable wireless network radio signal, measuring signal strength and noise level; and detecting the wireless access point's MAC address, if any;
    receiving any broadcast network characteristics from at least one other device on the network;
    comparing the first device network characteristics with the received network characteristics from the at least one other device on the network;
    if the network characteristics are within a predetermined relationship, the first device and the at least one other device are in proximity with one another.

2. The method of claim 1, further comprising broadcasting the first device network characteristics on the wireless network.

3. The method of claim 1, further comprising storing the measured signal strength, measured noise level and the MAC address.

4. The method of claim 1, further comprising if the location of the at least one other device is known, determining the first device's relative position from the at least one other device.

5. The method of claim 1, wherein network characteristics are broadcast using a protocol comprising:
    periodically broadcasting a UDP packet comprising the broadcasting device's identity and the measured network characteristics.

6. The method of claim 5, wherein a UDP packet is broadcast once during a period comprising a predetermined number of seconds.

7. The method of claim 6, further comprising synchronizing with any received UDP packets containing broadcast network characteristics.

8. A method for determining device proximity in a wireless network, comprising:
    characterizing at a first device any detected wireless network radio signals;
    receiving any broadcast network characteristics from at least one other device on the network;
    comparing the first device network characteristics with the received network characteristics from the at least one other device on the network, wherein the comparing step comprises: measuring the distance in radio space of the respective network characteristics, wherein distance in radio space is determined by measuring the sum of the cap in signal strength and noise level for each channel;
    if the network characteristics are within a predetermined relationship, the first device and the at least one other device are in proximity with one another.

9. The method of claim 8, wherein the distance in radio space is determined by measuring the sum of the gap in signal strength (SS) and noise level (NL) for each channel over a running window of time according to the relationship:

$$D_{Manhat\tan} = \sum_{ch} |SS_{ch} - SS'_{ch}| + \sum_{ch} |NL_{ch} - NL'_{ch}|.$$

10. The method of claim 9, further comprising:
    determining a degree of proximity of the first device and the at least one other device by comparing the distance in radio space with a predetermined threshold.

11. A method for determining device proximity in a wireless network, comprising:
    characterizing at a first device any detected wireless network radio signals, wherein the characterizing step comprises computing the radio characteristic as a set of records, one per channel, each record indicating the channel MAC address and the observed signal strength (SS) and noise level (NL);
    receiving any broadcast network characteristics from at least one other device on the network;
    comparing the first device network characteristics with the received network characteristics from the at least one other device on the network;

if the network characteristics are within a predetermined relationship, the first device and the at least one other device are in proximity with one another.

12. The method of claim 11, further comprising storing the radio characteristics in a time-stamped journal.

13. A method for indexing situations and actions associated with a device in a wireless network, comprising:

characterizing at a first location any detected wireless network radio signals, wherein characterizing comprises:

for each wireless access point emitting a detectable wireless network radio signal, measuring signal strength and noise level; and detecting the wireless access point's MAC address, if any;

associating an action or situation of the device with the network characteristics at the first location;

storing the network characteristics in an index of network characteristics;

comparing the network characteristics at the first location with any network characteristics stored in the index;

if the network characteristics at the first location are within a predetermined relationship to any network characteristics in the index, identifying any actions or situations associated with the network characteristics in the index.

14. The method of claim 13, further comprising storing the measured signal strength, measured noise level and the MAC address in the index.

* * * * *